United States Patent
Verman

(10) Patent No.: US 8,488,743 B2
(45) Date of Patent: Jul. 16, 2013

(54) NANOTUBE BASED DEVICE FOR GUIDING X-RAY PHOTONS AND NEUTRONS

(75) Inventor: Boris Verman, Bloomfield Hills, MI (US)

(73) Assignee: Rigaku Innovative Technologies, Inc., Auburn Hills, MI (US)

( * ) Notice: Subject to any disclaimer, the term of this patent is extended or adjusted under 35 U.S.C. 154(b) by 0 days.

(21) Appl. No.: 13/491,705

(22) Filed: Jun. 8, 2012

(65) Prior Publication Data

US 2012/0248345 A1 Oct. 4, 2012

Related U.S. Application Data

(63) Continuation of application No. 12/421,907, filed on Apr. 10, 2009, now Pat. No. 7,933,383.

(60) Provisional application No. 61/515,853, filed on Aug. 6, 2011, provisional application No. 61/044,148, filed on Apr. 11, 2008.

(51) Int. Cl.
 *G21K 1/00* (2006.01)
(52) U.S. Cl.
 USPC .................................. 378/145; 250/505.1
(58) Field of Classification Search
 USPC ............. 378/145, 147, 70, 84, 85; 250/505.1; 977/902, 742
 See application file for complete search history.

(56) References Cited

U.S. PATENT DOCUMENTS

| | | |
|---|---|---|
| 5,175,755 A | 12/1992 | Kumakhov |
| 5,192,869 A | 3/1993 | Kumakhov |
| 5,497,008 A | 3/1996 | Kumakhov |
| 5,570,408 A | 10/1996 | Gibson |
| 5,604,353 A | 2/1997 | Gibson et al. |
| 5,745,547 A | 4/1998 | Xiao |
| 6,041,099 A | 3/2000 | Gutman et al. |
| 6,333,966 B1 | 12/2001 | Schoen |
| 6,385,291 B1 * | 5/2002 | Takami .................... 378/84 |
| 6,504,901 B1 | 1/2003 | Loxley et al. |
| 6,697,454 B1 | 2/2004 | Nicolich et al. |
| 6,704,389 B1 | 3/2004 | Bievenue et al. |
| 6,749,300 B2 | 6/2004 | Bjeoumikhov |

(Continued)

FOREIGN PATENT DOCUMENTS

| | | |
|---|---|---|
| EP | 0 724 150 A | 7/1996 |
| WO | WO 2007/019053 A | 2/2007 |

OTHER PUBLICATIONS

International Search Report—PCT/US2009/040178—Jul. 23, 2009.

*Primary Examiner* — Irakli Kiknadze
(74) *Attorney, Agent, or Firm* — Brinks Hofer Gilson & Lione

(57) ABSTRACT

A nanotube based device for guiding a beam of x-rays, photons, or neutrons, includes a beam source and at least one nanotube. Each nanotube has an optical entrance positioned in a manner that a projection of the direction of the central axis at the optical entrance intersects with the beam source. Each nanotube may have an interior diameter that varies along the length of the nanotube. to point the entrances of a bundle of nanotubes toward a point-shaped beam source, the bundle can be grown as an array of multilayer nanotubes from a spherical growth plate. The clear aperture of the bundle is enhanced by providing a smaller number of wall layers of each nanotube near the growth plate than at a distance from the growth plate.

17 Claims, 7 Drawing Sheets

U.S. PATENT DOCUMENTS

| | | |
|---|---|---|
| 6,934,359 B2 | 8/2005 | Chen et al. |
| 6,935,778 B2 | 8/2005 | Bievenue et al. |
| 7,023,955 B2 | 4/2006 | Chen et al. |
| 7,072,439 B2 | 7/2006 | Radley et al. |
| 7,110,506 B2 | 9/2006 | Radley et al. |
| 7,209,545 B2 | 4/2007 | Radley et al. |
| 7,257,193 B2 | 8/2007 | Radley et al. |
| 7,382,856 B2 | 6/2008 | Radley et al. |
| 7,933,383 B2 | 4/2011 | Verman et al. |
| 2005/0041773 A1 | 2/2005 | Gibson et al. |
| 2008/0084967 A1 | 4/2008 | Matsuo |
| 2008/0159479 A1 | 7/2008 | Huang et al. |

* cited by examiner

NANOTUBE BASED DEVICE FOR GUIDING X-RAY PHOTONS AND NEUTRONS

CROSS REFERENCE TO RELATED APPLICATIONS

This application claims the benefit of U.S. provisional application entitled POLYCAPILLARY OPTIC, application No. 61/515,853 filed on Aug. 6, 2011, and of U.S. patent application entitled X-RAY GENERATOR WITH POLYCAPILLARY OPTIC, application Ser. No. 13/051,708 filed on Mar. 18, 2012, which is a continuation of U.S. patent application entitled X-RAY GENERATOR WITH POLYCAPILLARY OPTIC, application Ser. No. 12/421,907 filed on Apr. 10, 2009, which claims priority to U.S. provisional application entitled X-RAY GENERATOR WITH POLYCAPILLARY OPTIC, application No. 61/044,148 filed on Apr. 11, 2008, the entirety of all mentioned applications being hereby incorporated by reference.

TECHNICAL FIELD

The present invention relates systems for generating and controlling the beam direction of x-ray radiation for analytical instruments including x-ray diffractometry, x-ray spectrometry or other x-ray analysis applications using polycapillary optics.

BACKGROUND

X-rays and neutrons are an effective probe medium for evaluation of many features of materials. X-ray diffraction, spectrometry and microscopy are widely used for materials structure and composition measurements. Many applications require an x-ray beam having controlled beam characteristics in its interaction with the target, and some of them need an x-ray optic for an analysis of the beam after its interaction with the material sample. A variety of x-ray optics is in use in analytical instruments.

One of the x-ray optics that is in quite wide use is a glass polycapillary optic. The glass polycapillary optic comprises a bundle of hollow glass fibers arranged in some specific way. These hollow fibers guide x-rays entering them, and by total external reflection, the x-ray beam is transmitted along the fiber. Various polycapillary optic designs exist for focusing an x-ray beam, collimation, and the like.

A polycapillary optic can be used in a wide range of x-ray photon energies, but in the range of laboratory photon energies (5 to 25 keV) it has various benefits. It can provide a uniquely large geometrical solid collection angle up to several tens of steradians, which provides an efficient use of the x-ray energy emanating from the source. Further, the polycapillary optic can shape the beam in three dimensions.

These two features make polycapillary optics a preferred component of x-ray optics. An alternative arrangement can be provided with a crystal bent in two planes, but its capturing capabilities are lower due to limitations of angular acceptance in the diffraction plane of a Johann crystal.

A polycapillary focusing optic is preferably used in applications that do not require a high beam monochromaticity and can utilize a beam with a high convergence. Similarly, polycapillary collimating optics can provide a beam of large size and flux when requirements for the beam divergence are not too high.

Many analytical applications are suitable for polycapillary optics, and polycapillary optics are in wide use in micro x-ray fluorescence analyzers, x-ray diffractometers for stress and texture analysis, and many other applications.

The technology of glass polycapillary optic fabrication progressed significantly since their first use. A variety of optical arrangements and shapes can be produced. An opening lumen of a single capillary and the wall thickness can vary in a wide range, down to a micrometer-scale capillary diameter. On the other hand, a glass polycapillary optic is not free from some principal and technological limitations.

Capillary technology is currently limited to glass material formed in a high-temperature process. Currently, there is no technology available for a good control of mid and high spatial frequency roughness of the internal wall surface during this process. Absent a metrology for measuring the roughness directly, representative results of the roughness are currently obtained through modeling the optic with the different roughness parameters and comparing the results with experimental data. These results show that the internal capillary structure is not perfect. Further technology refinements may improve these parameters, but the internal surface roughness may affect optical efficiency well into the future.

A single capillary optic may be used as well, although not as universally as a glass polycapillary optic. Several typical shapes of single capillary optics are particularly common.

A straight single glass capillary is commonly used to form an x-ray beam with a predefined beam cross section and divergence. One advantage of a single straight capillary over a system with two pinholes is that the part of the beam that passes the first pinhole, but would miss the second pinhole, is retained in the optical path of the single capillary by total external reflection from the capillary walls. The mechanism of radiation penetration through the straight capillary is the same as for polycapillary systems, utilizing multiple total external reflections.

Similarly, conical single glass capillary can be used to concentrate x-ray radiation. A single total external reflection can be utilized in a capillary with a more sophisticated internal shape, for instance an ellipsoidal configuration. These kinds of optics are typically not made exclusively of glass, but include other materials.

One more specific device that provides x-ray beam with a width on a nanometer scale in one dimension is an x-ray waveguide. The coupling and propagation of radiation through this device is described in the terms of wave theory. The design condition could, however, be formulated in physical-geometrical terms for a three-layer symmetric structure: $\theta_C^c > \theta_C^g$, where $\theta_C^c$ and $\theta_C^g$ are critical total external reflection angles of outside cladding ($\theta_C^c$) and of guiding layers ($\theta_C^g$).

Similarly to the polycapillary glass optic, single capillary optics will benefit from a better surface precision and smoothness.

SUMMARY OF THE INVENTION

It is thus desirable to find novel alternatives to glass capillaries for further improvement of the optical efficiency of x-ray photon and neutron guides. According to a first aspect of the present invention, a device for guiding a beam originating a beam source comprises at least one nanotube with a shape that changes at least the beam shape or the direction of a beam propagating through the nanotube.

According to a further aspect of the present invention, the at least one nanotube may be partly or wholly made of carbon. The dimensions may be chosen for guiding x-rays or a neutron beam.

According to a further aspect of the present invention, the at least one nanotube is preferably oriented in a way that the optical entrance points toward the beam source. For shaping the beam, the at least one nanotube may, for example, have a section with a decreasing inner diameter or a conical interior surface proximate the optical exit. The interior diameter may decrease from the optical entrance toward the optical exit for enhancing the beam density.

According to a further aspect of the present invention, a multilayer nanotube having a plurality of coaxial cylindrical walls decreases photon losses compared to a single-wall nanotube. The material of the multilayer nanotube can be chosen to provide layers of the same material or of different materials. One or more of the walls may consist of carbon. Where the walls consist of different materials, the materials may be arranged in an order in which a critical total external reflection angle of successive walls increases in a radially outward direction from the central axial line.

According to a further aspect of the present invention, the internal diameter of a multiwall nanotube may be altered by adding or removing inner walls.

According to a further aspect of the present invention, colossal nanotubes are suitable for photon wavelengths with a larger critical total external reflection angle than hard x-rays.

According to a further aspect of the present invention, the device according to the invention may comprise a bundle of self-assembled nanotubes.

At least a portion of the nanotubes of the bundle may be multilayer nanotubes having a wall thickness that varies along the length of the nanotube due to a change in the number of coaxial walls.

According to a further aspect of the present invention, a smaller outer diameter and a smaller number of coaxial walls at the optical entrance than remote from the optical entrance increases the clear aperture of the nanotube bundle at the optical entrance.

According to a further aspect of the present invention, the nanotube bundle can be grown by simultaneous propagation from a growth plate, particularly from a spherical growth plate for receiving a beam from a point-shaped beam source.

Further details and benefits of the present invention become apparent from the subsequent description of several preferred embodiments illustrated in the attached drawing figures.

DETAILED DESCRIPTION OF THE INVENTION

Entirely new tubular structures developed during last two decades are called nanotubes. The name nanotube refers to the thickness of these tubes that is typically in a sub-micrometer range. Several properties specific to the nanostructure of these tubes have contributed to a variety of new product applications: as light and electron emitters, as reinforcement for industrial and construction materials, as thermoconducting medium for heat transfer, and many others.

C (carbon) is the most common element of these structures, but nanotubes from other materials such as boron nitride, silicon oxide, and rare earth fluoride have been fabricated, as well. This variety suggests that a relatively wide selection of materials of varying effective atomic numbers may be available.

Figure 1:
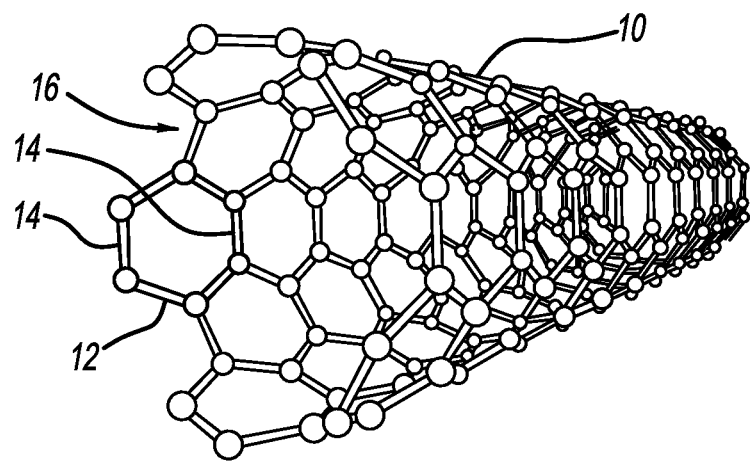
FIG. 1 shows a carbon nanotube with an armchair structure.
Figure 2:
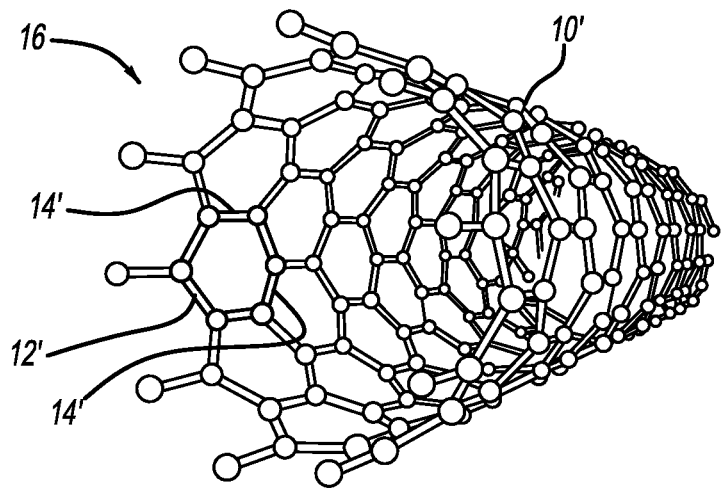
FIG. 2 shows a carbon nanotube with a zigzag structure.
Figure 3:
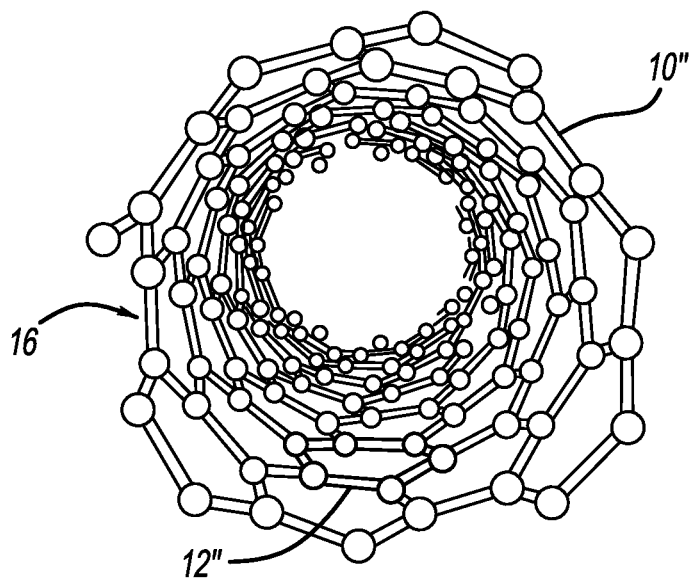
FIG. 3 shows a carbon nanotube with an intermediate chirality.

As illustrated in FIGS. 1 through 3, a carbon nanotube can be described as rolled graphene sheets with seamlessly connected edges. As graphene is a single layer of carbon atoms arranged in a honeycomb pattern 16, a nanotube possesses a so-called chirality that is determined by the direction in which the graphene sheet is rolled up and that characterizes the orientation of the hexagons 12, 12', and 12" forming the honeycomb pattern 16.

FIG. 1 illustrates a so-called "armchair" structure of a carbon nanotube 10, in which the hexagons 12 each have a pair of opposing sides 14 that extend in the circumferential direction of the nanotube. FIG. 2 is an example of a nanotube 10' with a so-called "zigzag" structure, in which the hexagons 12' each have a pair of opposing sides 14' extending in the axial direction of the nanotube 10'. FIG. 3 depicts a nanotube 10" with an intermediate chirality, in which the hexagons 12" have neither purely axial nor purely circumferential sides.

Nanotubes can be grown by self-assembly. Methods of growing nanotube from a growth plate include chemical vapor deposition on coated silicon substrates using various catalyst films.

The growth of nanotube by self-assembly creates nanotubes with walls including interior wall surfaces that are smooth to the atomic level, similar to an atomic plane of a perfect crystal. As will be explained in more detail below, the use of self-assembled carbon nanotubes in polycapillary systems for x-ray optics can be sufficiently described with macroscopical considerations. Therefore, polycapillary structures for x-ray optics can utilize nanotubes of any chirality. In the following, single-wall nanotubes will be designated with reference numeral 10, regardless of individual chiralities. Furthermore, in the subsequent figures, a specific chirality may be depicted for purely illustrative purposes. Any shown chirality can be replaced with any other chirality without leaving the scope of the present invention.

Figure 4:
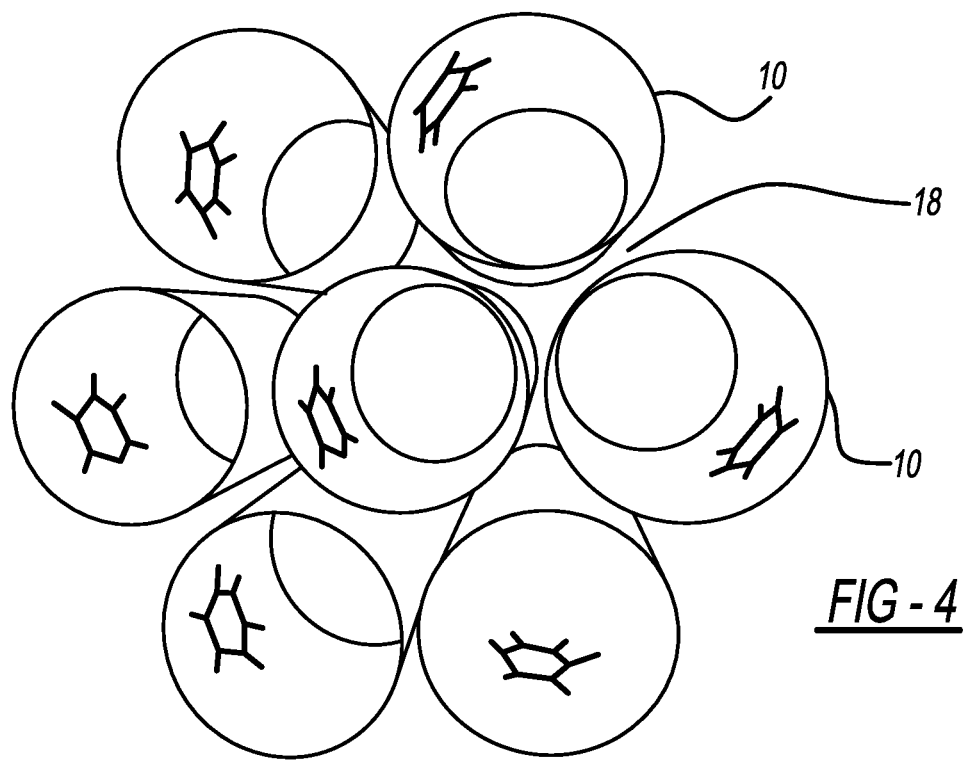
FIG. 4 shows a spatially arrangement of carbon nanotubes in a nanotube bundle.

For producing a polycapillary optic, individual carbon nanotubes 10 can be arranged in bundles as illustrated in FIG. 4. The most compact arrangement of cylindrical nanotubes 10 is obtained in a hexagonal structure as illustrated. This arrangement also minimizes gaps 18 between the nanotubes 10 that lead to a photon loss of an incoming x-ray beam.

Nanotubes can be produced as single-layer or single-wall nanotubes or as multi-layer or multi-wall nanotubes. A single-wall nanotube 10 has one layer of carbon atoms as shown in FIGS. 1-4.

Figure 5:
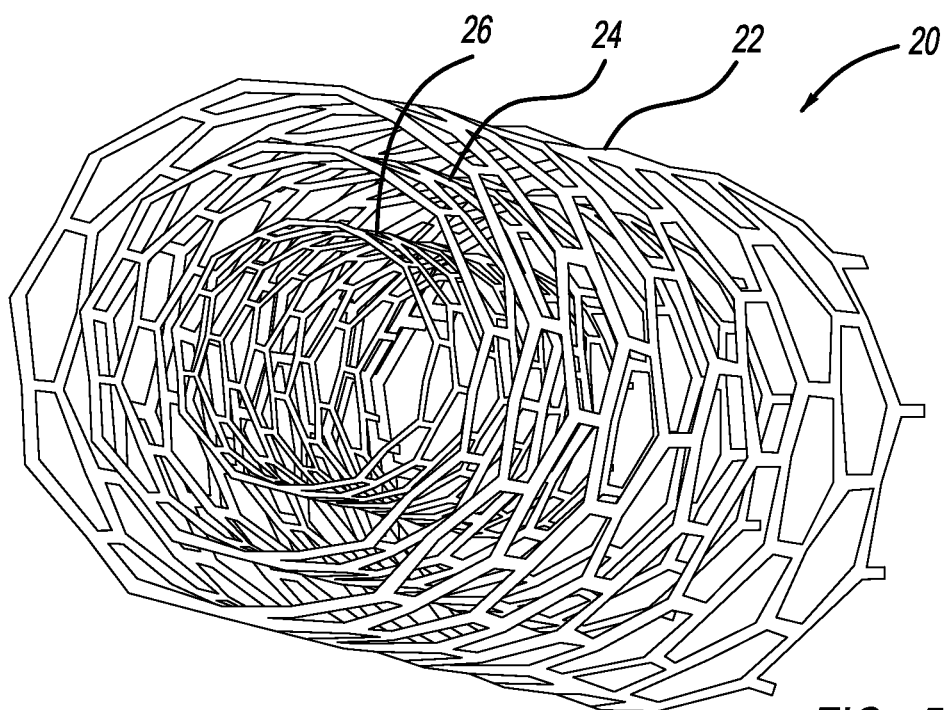
FIG. 5 shows an example of a multilayer nanotube.

A multi-wall nanotube 20 has a plurality of concentric nanotubes 22, 24, and 26 arranged inside each other. FIG. 5 illustrates such a multi-wall nanotube 20 consisting of the three single-wall nanotubes 22, 24, and 26. In an ideal multi-wall nanotube 20, the individual layers 22, 24, and 26 of carbon atoms do not share any covalent bonds with each other so that the carbon atoms are connected by much higher forces within one layer than with carbon atoms occupying a different layer.

Multilayer carbon nanotubes, for example, have been successfully grown via vapor deposition on a tungsten-coated silicon substrate with a sputtered nickel catalyst film. In an atmosphere of nitrogen and acetylene gases, temperatures ranged between 630 and 790° C. Diameters of the multiwall nanotubes are adjustable by varying the substrate temperature.

Figure 6:
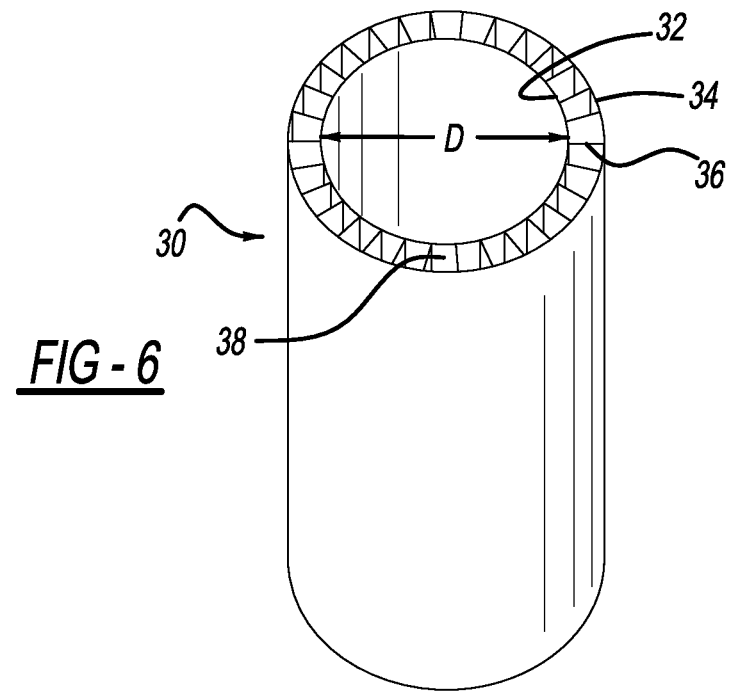
FIG. 6 shows a structure of a colossal nanotube.

As illustrated in FIG. 6, colossal nanotubes 30 resemble multiwall nanotubes 20 with large diameters D ranging between about 40 μm and about 100 μm, in which the individual concentric layers 32 and 34 of the colossal nanotube are interconnected with radial webs 36 of graphene extending along the length of the colossal nanotube 30. These webs 36 stabilize the nanotube structure and are usually arranged at a distance from each other that approximately corresponds to a typical distance of graphene layers in graphite so that longitudinal channels 38 are formed between the concentric graphene layers 32 and 34 of the colossal nanotube 30. The channels 38 have an approximately rectangular or trapezoid cross-section.

Colossal nanotubes 30 as shown in FIG. 6 could be used as a basic optical element for relatively low energy photons that have a larger critical angle of total external reflection than high-energy photons. Colossal nanotubes 30 are relatively stable and thus are suitable for use in a single capillary optic. Alternatively, colossal nanotubes 30 could be a part of a polycapillary optic for soft x-rays because their diameter is typically larger than what is considered optimal for x-rays of a shorter wavelength that undergo total external reflection only at small incident angles.

Figure 7A:
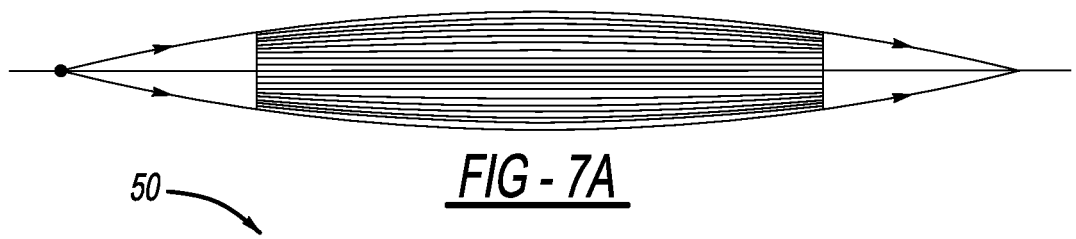
FIGS. 7A, 7B, and 7C schematically show principles of focusing and collimating polycapillary optics.
Figure 7B:
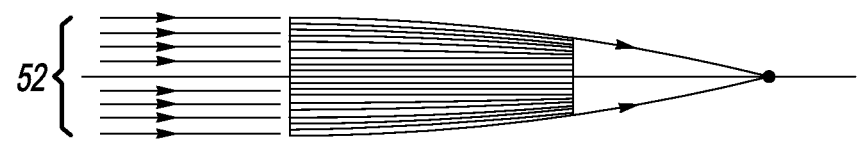
Figure 7C:
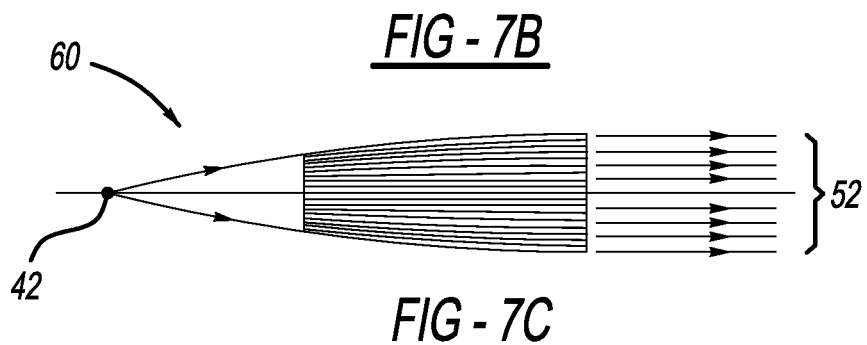

The following considerations are applicable to conventional polycapillary optics and polycapillary nanotube structures alike. Polycapillary optics are primarily used for focusing or for collimating an x-ray beam. FIGS. 7A and 7B show focusing optics 40 and 50 utilizing a polycapillary arrangement. The arrangement of FIG. 7A is configured for a point-shaped beam source 42, while the arrangement of FIG. 7B is configured to focus a parallel light beam 52. FIG. 7C illustrates a collimating optic 60 that transforms light originating from a point-shaped beam source 42 into a parallel light beam 52. Notably, the collimating polycapillary optic 60 of FIG. 7C is in principle an inverted focusing optic 50 for a parallel light bundle as illustrated in FIG. 7B.

While in the following, the description may refer to a light source or a light wave, it should be understood that the term "light" is used in a broad sense to include beams of particles that behave in a similar way as photons or neutrons and should not be viewed as a limitation to electromagnetic waves. Likewise, any description referencing photons or x-rays is also applicable to other particles exhibiting similar behavior.

A total external reflection inside a capillary occurs in that an incident light wave penetrates an interior capillary wall from inside lumen of the capillary and is redirected back to the interior surface. Total external reflection is a phenomenon observed with x-ray-like radiation because for x-ray-like wavelengths, many materials have a real component of the refractive index that is smaller than 1. After total external reflection, the light wave leaves the medium at an angle identical to the incident angle of the light wave. The wave intensity distribution inside the medium is described in an exponential function of the distance from the surface of the medium. The penetration depth $Z_0$ describes the depth under the geometrical medium surface where the wave intensity is reduced to 1/e. "e" is the dimensionless Euler Number, which approximately equals 2.7182.

A so-called multi-bounce polycapillary optic, referring to multiple reflections inside a capillary, works most effectively under the condition that the entire range of incident angles of incoming photons remains below the so-called critical angle $\theta_C$ of the medium material. In this context, the critical angle $\theta_C$ is the threshold angle for total reflection measured from a plane tangential to the reflecting surface. This definition for capillary systems differs from the typical definition of the term "incident angle" when used in classic optics dealing with total internal reflections on a plane. The mentioned penetration depth $Z_0$ in this range of incident angles does not depend on any x-ray photon energy and is entirely defined by the medium material, mostly its mass density. The penetration depth $Z_0$ decreases from 4.1 nm for carbon, through 3.2 nm for glass to 1.2 nm for heavy metals.

Figure 8A:
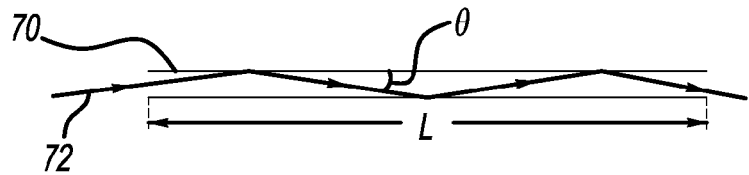
FIGS. 8A and 8B schematically show different modes of total reflection in a capillary.
Figure 8B:
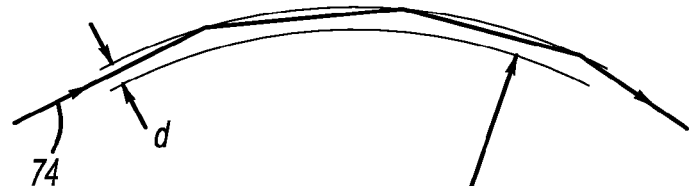

FIGS. 8A and 8B illustrate different propagation modes inside a multi-bounce capillary 70. Each single capillary 70 of a polycapillary optic can be bent to deflect an x-ray photon 72 or 74 from its initial incident direction to the direction desirable at the optical exit of the capillary 70.

For a clarity and simplicity, the following considerations apply to the principle of a collimated optic 60 depicted in FIG. 7C. The capillary ends proximate the beam source 42 are preferably aligned to point toward the point-shaped beam source 42, and the opposite ends of the capillary are parallel for collimation. This means that each capillary 70 is bent to a specific curvature that depends on its radial distance from the center axis X of the optic 60, in the following called the optical axis X. The following condition that restricts the radius R of the capillary curvature to ensure that all reflections occur at angles below the critical angle:

$$R \geq 2 \cdot d/\theta_C^2 \quad (1)$$

where d is the capillary diameter, $\theta_C$ is the critical angle of total external reflection measured from a plane tangential to the reflecting surface. This expression is a base for a capillary optic design for avoiding a significant photon loss during photon propagation.

Another consideration is that two different modes of photon propagation occur in a multi-bounce optic, depending on the radius of the capillary curvature shown in FIGS. 8A and 8B. FIG. 8A illustrates a straight or "slightly" bent capillary 70. The multiple reflections occur in an alternating manner on opposite sides of the capillary wall in a so-called double-wall reflection mode. As shown in FIG. 8B, in a capillary 70 bent with a smaller radius R, reflections occur repeatedly on the same side of the capillary wall in a so-called garland reflection. Depending on the prevailing conditions, the total number of reflections and thus the photon loss during transmission varies. Accordingly, any quantitative description of polycapillary lens performances depends of the mode of propagation. A simple geometrical analysis suggests that the condition of the transition from one mode to the other is:

$$\theta_{tr} = (2d/R)^{1/2} \quad (2)$$

where $\theta_{tr}$ is the incident angle of a photon entering a capillary with the opening diameter d and a curvature with a bending radius R, at which a transition from the double-wall mode of FIG. 8A to the garland mode of FIG. 8B occurs. This observation applies to incident angles θ measured from a plane tangential to the reflecting capillary wall. If the incident angle θ of a photon hitting the outer wall of the capillary with radius R is greater than $\theta_{tr}$, the double-wall reflection mode of FIG. 8A applies, while the garland reflection of FIG. 8B occurs if θ is smaller than $\theta_{tr}$. This means that both modes are typically present in the polycapillary optic because capillaries located at a larger radial distance from the optical axis X have a locally smaller bending radius R than those close to the optical axis X.

While the bending radius R may change over the length of a capillary 70, a useful simplification for approximate calculations assumes a constant bending radius R over the length L of the capillary 70. Because in a circularly bent capillary 70, the photon incident angle θ does not change, the mode of propagation remains the same during propagation. For calculating a capillary transmission, the number of reflections and the reflectivity should be known as functions of the incident angle θ.

A simple geometrical analysis suggests that the number of reflections N in the garland reflection mode of FIG. 8B is defined by the expression:

$$N = L/(R*2*\theta) \quad (3)$$

where L is the length of the capillary.

The quantity of reflections N in double-wall reflection mode is defined by the expression:

$$N = L/(R*(\theta_o - \theta_i)) \quad (4),$$

where $\theta_o$ and $\theta_i$ are incident angles on outside (concave) and inside (convex) walls of the capillary.

The outside and inside incident angles $\theta_o$ and $\theta_i$ are related to each other according to the equation:

$$\theta_o^2 = \theta_i^2 + 2*d/R \quad (5)$$

Two notable observations result from the expressions (3)-(5).

First, the expression (4) results in $N = L/(R*\theta)$ when the inside angle $\theta_i$ approaches zero and the outside angle is represented by the angle θ. This expression coincides with the quantity of reflections in a straight capillary.

Second, the expressions (3) and (4) suggest that the quantity of reflections change with a step at $\theta_{tr}$: if one considers a transition from smaller θ (garland reflection) to larger θ (double-wall reflection), the number N of reflections doubles from $L/(R*2*\theta)$ to $L/(R*\theta)$. Notably, however, the reflectivity as a function of the incident angle θ changes smoothly because the incident angle θ on the convex interior wall is equal to zero at the point of transition and the reflectivity is 100% at an incident angle θ equal to zero, independent of the material of the reflecting wall. Single reflection reflectivity as a function of the incident angle θ other than zero can be calculated using Fresnel formulas through physical constancies of the materials.

The considerations above are sufficient for calculations of a collimating capillary lens transmission with the following simplifying assumptions: Only rays propagating in a two-dimensional axial plane containing the optical axis are considered; and the size of the point-shaped beam source in the focal spot is negligible.

A single-wall nanotube 10 provides a limited reflectivity at total reflection angles because it includes only one atomic layer of carbon atoms arranged in a honeycomb pattern 16. The single layer does not provide the penetration depth $Z_0$ of 4.1 nm given above for carbon. Also, the value of 4.1 nm for the penetration depth $Z_0$ does not mean that a nanotube wall of such thickness reflects all incident light. According to the definition of the penetration depth $Z_0$ above, a layer with the thickness of $Z_0$ reflects only a portion of 1-1/e (or 63%) of the photons compared to an infinitely thick layer. This level of reflectivity is dissatisfactory for optics involving multiple reflections. To avoid a significant loss of efficiency due to a finite wall thickness, the loss of reflectivity is preferably very small. If for a given incident angle θ and for a given energy, the reflectivity of a medium of infinite thickness is ρ, then a photon flux loss attributed to a single reflection on the infinitely thick wall is (1–ρ). To obtain a finitely thick wall for which the additional loss of reflectivity due to the finite thickness is smaller than that value (1–ρ), the following approximate qualitative assessment can be made.

The minimal thickness T of the walls could be calculated as:

$$T = Z_0 * \ln(1/(1-\rho)) \quad (6),$$

where $Z_0$ is the penetration depth.

A wide range of incident angles, from zero to the critical angle are typically present when a beam propagates through a multi-capillary optic. The number of reflections inside the capillary depends on the initial incident angle, capillary bending and the mechanism of propagation.

Some criterion for the choice of the wall thickness will be given below. As an example, to limit the reflectivity loss due to the finite wall thickness to an amount equal to the photon loss at a single reflection with the incident angle of $\theta_c/2$ from a wall with infinite wall thickness, the wall thickness T should be 30 nm for silicon oxide nanotubes and 37 nm for carbon nanotubes. This means that for obtaining high reflectivity and transmission, nanotubes can be configured to have multiple walls, possibly hundreds. The number of concentric walls may vary.

In the following, the contemplations on polycapillary optics are applied to nanotubes arranged in a collimating optic as illustrated in FIG. 7C. For the following calculations, three approximations are made: The distance from the source to the optical entrance is 4 mm; the nanotube bending radius R is constant and the internal diameter d is constant along the nanotube length L.

The resulting lens design parameters and transmission are given in Table 1 below.

TABLE 1

Lens design parameters and performances summary

| | | Nanotube Material | | | |
|---|---|---|---|---|---|
| | | Silicon oxide | | Carbon | |
| Radiation | | Cu | Mo | Cu | Mo |
| Wavelength range | nm | 0.152 | 0.71 | 0.152 | 0.71 |
| Tube opening | nm | 144 | 148 | 176 | 191 |
| Tube wall thickness | nm | 28.8 | 29.7 | 35.2 | 38.2 |
| Lens entrance diameter | mm | 2.9 | 2.9 | 2.9 | 2.9 |
| Lens exit diameter | mm | 7.9 | 27.1 | 12.0 | 49.7 |
| Lens length | mm | 7.2 | 44.8 | 15.3 | 89.0 |
| Transmission | | 0.288 | 0.425 | 0.669 | 0.713 |
| Transmission area density | $mm^{-2}$ | 5.92E−03 | 7.37E−04 | 5.87E−03 | 3.68E−04 |

For a rough assessment under even unfavorable conditions, a calculation was carried out for lenses with an extremely large capture angle of 1 radian in each plane (a capture angle significantly larger than typically considered for casual glass lenses). The results show that the lens transmission reaches a useful value, even under these extreme conditions.

A high-yield transmission and a compact design of nanotube-based polycapillary optics is possible by using very small capillary diameters d, preferably less than 200 nm. It is further evident from the calculation that carbon nanotubes promise a higher transmission in the considered range of photon energies as a result of a higher reflectivity of material with a lower effective atomic number. The parameter denoted in the table as transmission area density is the ratio of the lens transmission and the area of the beam at the lens exit. A higher value of this parameter represents a higher flux density at the lens exit, which may be desirable for some applications. Silicon oxide nanotubes promise a higher value of this parameter with Molybdenum (Mo) radiation. This means that the lens design parameters and material can be matched for optimal performance for a given application.

It is possible to compare these results with the predictions for a traditional glass polycapillary lens. Applying the above-described model to an ideal glass capillary lens having an ideal wall surface without waviness or misalignment of capillaries and with an generous capillary diameter of 1.5 μm, about ten times larger than that of the nanotube lens for Cu radiation, and a wall thickness of 0.1 μm, the calculated transmission area flux density is about 50 times lower than for the nanotube lens. With these parameters, the improvement of a nanotube optic over any real glass polycapillary optic with imperfections on internal walls will likely be more than two orders of magnitude.

In all examples, the photon wavelength is at least 1000 times smaller than the capillary diameter. These proportions suggest that a simple geometrical assessment should provide reasonable predictions.

Figure 9:
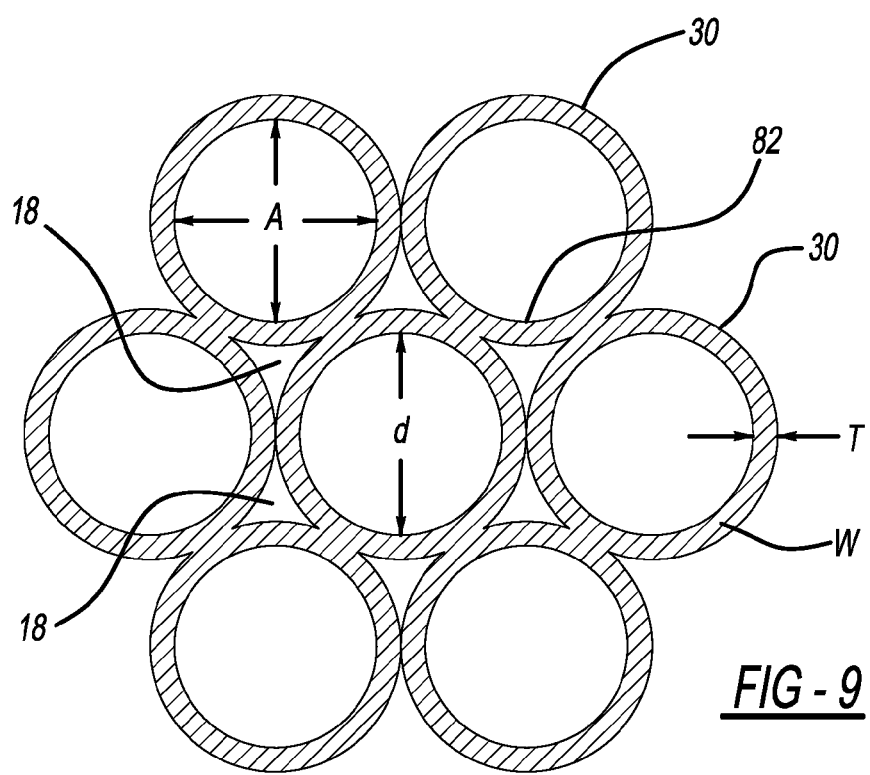
FIG. 9 shows a simplified cross-section of a nanotube bundle for illustrating the clear aperture of the bundle.

A bundle of multiwall nanotubes can be used to form a lens that shapes an x-ray beam. FIG. 9. shows a partial schematic cross-section through such a nanotube bundle. The transmission calculation above counts the photons that hit an internal wall 82 of one of the bundled nanotubes 30 once the photons have entered the nanotube 30. But the entrance of a nanotube bundle has areas of photon loss caused by two factors.

First, the nanotubes have a finite wall thickness T, and the ratio between the open nanotube cross-section A (the lumen) and the wall cross-section W, indicated by hatching in the drawing, defines the clear nanotube aperture. For this example, it is assumed in the calculations that the ratio K of the inner nanotube diameter d and its wall thickness T is five. The clear nanotube aperture is about 51% in this case. With larger K value, for example with K=10, the clear nanotube aperture can be increased to about 69%, but this will approximately double the lens dimensions and will reduce the flux density of the collimated beam.

Second, there is empty space 18 between the tubes. The packing coefficient for a hexagonal circular tube arrangement is about 91%.

So, to find a lens efficiency the value of transmission given in the table above has to be multiplied with the clear aperture factor of about 0.46, corresponding to the product of 51% and 91%. Still, even an efficiency in the range of about 0.1-0.3 (equal to about 10-30%) is attractive for the large solid capture angle of about 1 steradian on which the calculations above were based.

Nanotube technology made a tremendous progress since the discovery of nanotubes. Because of numerous promising applications of nanotubes, especially carbon nanotubes, multiple growth mechanisms and specific technological steps have been developed and implemented. Some of them are relevant for nanotube x-ray optics and are described below.

Nanotubes from a variety of materials as carbon, polystyrene, boron nitride, silicon oxide, fluoride of rare earth elements, can be produced in large quantities. Nanotubes can be grown in a consistent structure and in compact bundles.

The combination of several technological approaches allow to design and build a nanotube based device for guiding x-ray photons and neutrons with features and performances not achievable with traditional glass capillary technology.

A preferred device for guiding x-ray photons and neutrons utilizes self-assembled nanotubes for total external reflection of photons or neutrons. One major advantage of self-assembled nanotubes as a photon-guiding element is their smooth surface on an atomic level. Further, the possibility to control their growth in a predictable manner allows a precision that exceeds the quality of traditional glass capillary technology.

Figure 10:
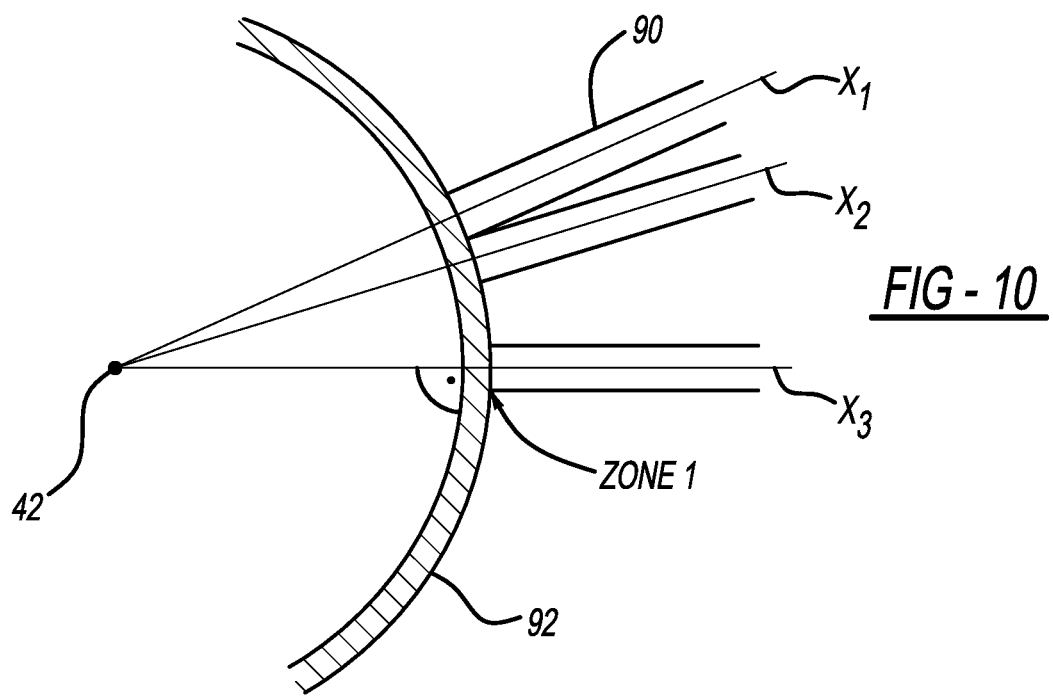
FIG. 10 schematically shows a nanotube arrangement at a growth plate for assembling polycapillary optics configured for a point-shaped beam source.
Figure 11:
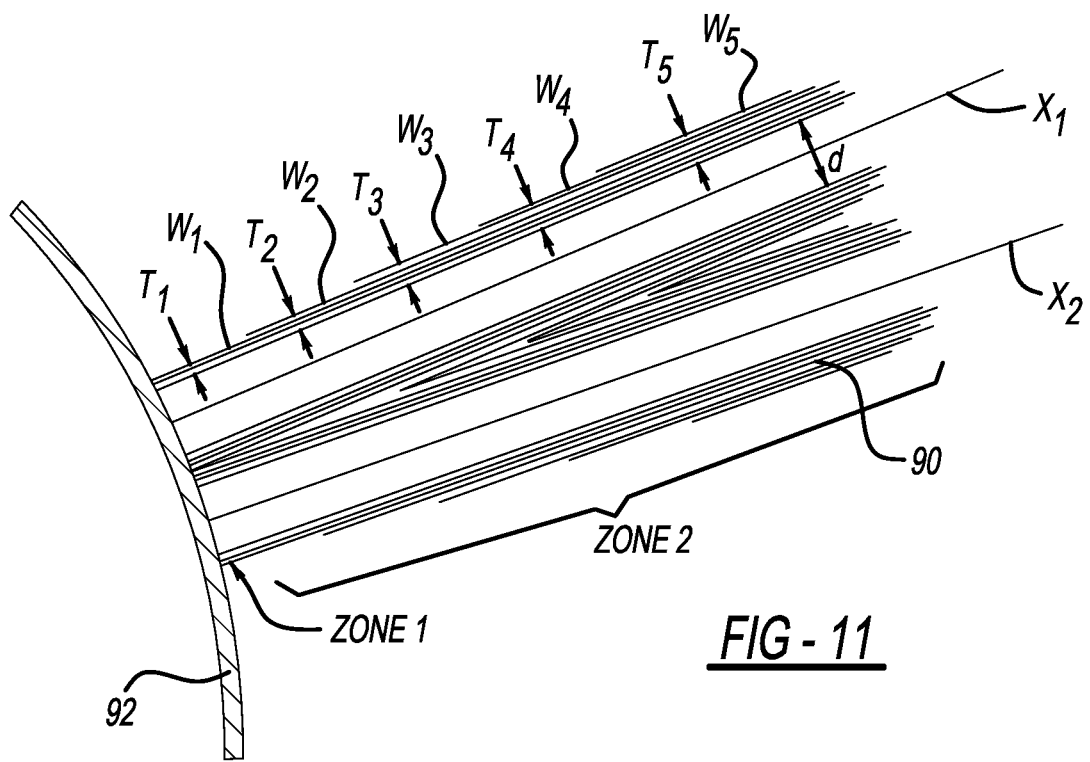
FIG. 11 shows nanotube assembly with an increasing wall thickness in the vicinity of the growth plate.

Multiwall nanotubes 90 as shown in FIG. 10 can be grown with a controllable inner diameter d and wall thickness T. Of particular interest may be a configuration of multiwall nanotubes 90 with specific adjusted positions of subsequent outer layers $w_i$ as shown in FIG. 11.

The multiwall nanotubes can be grown with a specified spacing from each other and in a direction normal, i.e. perpendicular, to a growth plate. For assembling a photon-guiding nanotube the axes of nanotubes will be aligned precisely along the propagation directions of an incoming beam.

As previously illustrated in FIGS. 7A through 7C, two cases occur most often: a parallel incoming beam and a point source.

For a parallel incoming beam, parallel nanotubes can be grown from a planar growth plate. The axes of the self-assembling nanotubes are all perpendicular to the growth plate surface and can be distributed evenly across the growth plate. The nanotube growth perpendicular to the growth plate provides that their axes are parallel, at least in the vicinity of the growth plate.

For obtaining a divergent bundle of nanotubes 90, the nanotubes 90 can be grown from a spherical growth plate 92 as shown in FIGS. 10 and 11. This setup allows proper positioning of the entrance side of the nanotube assembly intended to capture radiation from a point-shaped x-ray source 42.

To initiate nanotube self-assembly intended for coupling with a point-shaped beam source, the base growth plate shape can be spherical as it is shown in FIGS. 10 and 11. The area adjacent to the growth plate is shown in FIGS. 10 and 11 as zone 1. All tube axes $x_1$, $x_2$, and $x_3$ converge to the spherical center of the growth plate 92. Remote from the growth plate, the nanotubes 90 may have a bent shape so that the central axes $x_i$ form bent central axial lines.

After removal of the growth plate 92, a point-shaped beam source 42 is placed preferably in the location of the spherical center with respect to the nanotubes 90. The point-shaped beam source 42 is thus located in the point at which the central axial lines projecting from the nanotubes intersect. For any other angular distribution of an incoming beam, the growth plate can be shaped to form a growth surface normal to the respective ray direction at each surface point.

Without limitation, the following example refers to a nanotube assembly design intended for guiding a diverging beam originating from a point-shaped beam source 42. The description below applies in analogy to any other diverging beam.

The minimal internal nanotube diameter that can be grown in this manner ranges in the order of magnitude of about 1-2 nm. The internal nanotube diameter d for an x-ray photon guide is preferably about a hundred times larger than the minimal nanotube diameter. The reason for such dimension is that the suitable wall thickness T providing a sufficient total reflection is in the order of tens of nm. Thus, for obtaining a favorable clear nanotube aperture, the internal nanotube diameter d is preferably chosen to be five to ten times larger than the wall thickness T. Implementing a larger tube diameter d leads to a larger bending radius R, larger device dimensions and a reduced flux density.

To improve the flux density, a procedure can be used that allows improving the clear aperture of the lens without increasing overall lens dimensions. The resulting structure is shown in FIG. 11, designated as zone 2. The ends of the external layers $w_i$ of each multiwall nanotube 90 are displaced relative to each other. In zone 1, the nanotube growth starts with an initial thickness $T_1$ and layer $w_1$ forming the outermost layer of the nanotube 90. With increasing distance from the growth plate 92, outer layers $w_2$, $w_3$, $w_4$, $w_5$, and so on, are added to each nanotube 90, increasing the wall thickness T from $T_1$ to $T_2$, to $T_3$, $T_4$, $T_5$, etc., until the individual wall thickness T of each nanotube 90 is sufficient for reducing photon losses to an acceptable level. This procedure allows a gradual increase of the nanotube wall thickness T while keeping the internal nanotube diameter d small.

The initially small wall thickness $T_1$ is advantageous at the entrance of a multiwall nanotube 90 because the percentage of the open aperture relative to the occupied growth plate surface is increased compared to nanotube bundles with a constant wall thickness T. The thinner nanotube wall thickness $T_1$ at the very entrance in zone 1 and zone 2 has a negligible effect on the intensity of the overall transmission because very few reflections occur in this area. At greater distances from the growth plate 92, an optimal nanotube wall thickness T can be chosen to support a high reflectivity for thousands of reflections.

Accordingly, the nanotube wall thickness T can, for example, start at about four to five times the above described penetration depth $Z_0$ (about 4 $Z_0$ to 5 $Z_0$) at the growth plate in zone 1 and gradually increase to about 10 $Z_0$ or 20 $Z_0$ in zone 2 without reducing the clear nanotube aperture. The increasing number of layers $w_i$ in zone 2 of FIG. 11 is not representative of the actual number of layers $w_i$ of each nanotube 90, which is much greater when the wall thickness T corresponds to multiple penetration depths $Z_0$.

In a preferred embodiment, the wall thickness T increases at a rate that compensates the increasing distances between the nanotubes 90 as the nanotubes progress from the growth plate 92 along radially extending central axial lines $x_1$, $x_2$, and $x_3$. In this manner, the neighboring nanotubes 90 touch each other with their outer layers $w_i$ at each added layer $w_i$ of wall thickness T. Due to the contact among the nanotubes 90, zone 2 of the assembly near the growth plate is rigid and well defined. The rigidity of nanotube assembly facilitates a removal of the assembly from the growth plate 92. Once the desired wall thickness T has been reached, the individual nanotubes 90 can separate from each other and progress along separate paths. as indicated in FIG. 10.

This feature combined with the self-assembling growth mechanism allows a precise positioning of all nanotubes 90 in the assembly. A similar precision is likely not achievable with technology for manufacturing polycapillary optics made of glass.

Another preferred configuration of a nanotube assembly concerns an improvement to the flux density of the outgoing beam and a reduction of the beam divergence at the assembly exit where a quasi-parallel outgoing beam is desirable. To reduce the beam divergence, a capillary system commonly includes a conically expanded part, often forming the exit portion of each capillary. It is known that a photon, after incurring multiple reflections on such conical surface, propagates at a reduced angle relative to the central axis of the cone.

In glass polycapillary designs, this conical capillary expansion is often combined with capillary bending. This is not always an optimal approach for reducing the beam divergence in a nanotube assembly.

Figure 12:
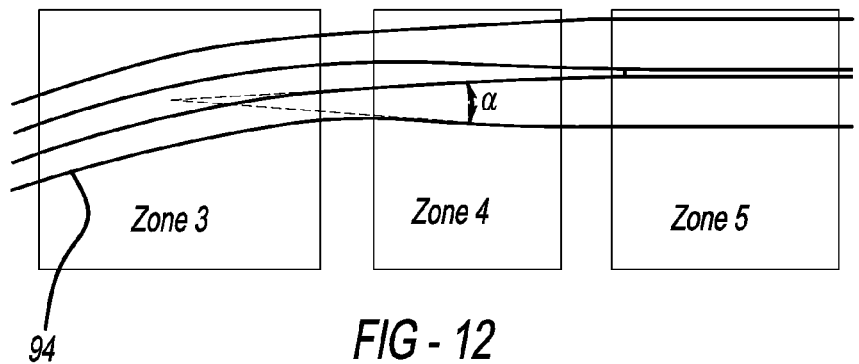
FIG. 12 shows a nanotube-based nanoguide having several zones of different configuration.

As described above, two mechanisms of photon propagation are present in a polycapillary optic such as a nanotube assembly. The most frequently occurring mechanism in optics with a high capture angle is the garland reflection. Expanding the nanotube diameter will not reduce the incident angle for photons propagating in the garland mode because these photons are not affected by any angle between opposite walls of the nanotube. It is thus preferable for a nanotube assembly intended for collimating an x-ray beam to have two distinguished areas: one area of nanotube bending, designated as zone 3, where photons might propagate in the garland mode, and another substantially straight area of expanding nanotube diameter, designated as zone 4, as shown in FIG. 12.

Figure 13:
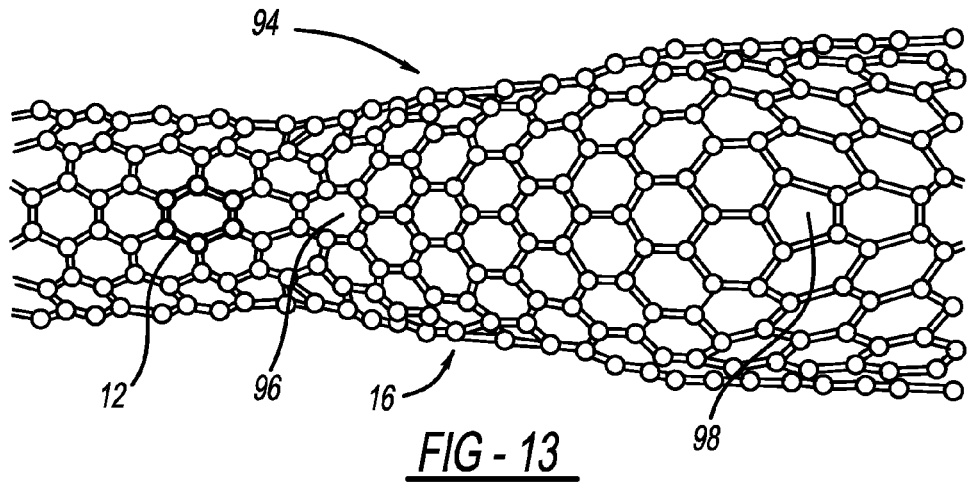
FIG. 13 schematically shows a change in nanotube diameter by insertion of pattern irregularities.

One technology that is feasible for expanding a nanotube diameter is shown in FIG. 13. An insertion of a heptagon 96 in the honeycomb pattern 16 in the place of one of the hexagons 12 of an otherwise cylindrical nanotube wall leads to a conical expansion of the nanotube 94. A subsequent insertion of a pentagon 98 returns the nanotube 98 to a cylindrical shape of a larger diameter. An effective opening angle α of a sequence of conical expansions, shown in zone 4 of FIG. 12, can be controlled by the arrangement of heptagons 96 and pentagons 98. The number of heptagons 96 inserted around the circumference of the nanotube 94 determines an incremental opening angle of each individual conical expansion. The axial distance from the heptagons 96 to an identical number of pentagons 98 determines the length of the conical expansion, and the axial distance of the pentagons 98 to the next group of heptagons 96 determines the length of an intermediate cylindrical section between two conical expansions. A sequential use of nanotube diameter transitions with defined steps of incremental conical expansions along the nanotube length will create a quasi-conical overall surface with an overall opening angle α composed of incremental opening angles and intermediate cylindrical portions. Each step of the diameter change is smaller than the typical distance between atoms. For an x-ray beam having a wavelength much greater than the distances between atoms, the quasi-conical surface is smooth for the total external reflection mechanism.

While FIG. 13 shows a single-layer nanotube 110 with only one expansion step for clarity, the insertion of irregularities can be performed in each one of the coaxial walls of a multi-layer nanotube at predetermined axial distances.

Several features are intended for improving nanotubes positioning and arrangement contributing to an improvement in performances of the nanotube assembly.

Preferably, an area with constant nanotube diameters is located at the exit of a collimating optic assembly as shown in FIG. 12, zone 5. This feature allows aligning the nanotubes 94 parallel with a high precision by compressing the assembly so that the outer layers of the individual nanotubes 94 touch each other. This allows a proper alignment of the low-divergence beam exiting the conical portion of the tubes in zone 4.

Figure 14:
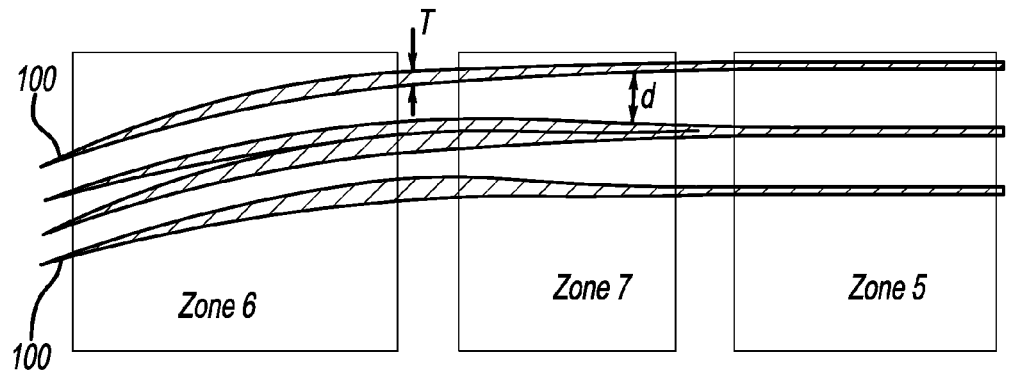
FIG. 14 shows an alternative nanotube-based nanoguide having several zones of different configuration.

An alternative preferred aspect of the present invention is a gradual increase of the nanotube wall thickness T in the bent area, designated as zone 6 in FIG. 14. The configuration of zone 6 is interchangeable with zone 3 shown in FIG. 12. As illustrated in FIG. 14, the wall thickness T of the individual nanotubes 100 in the assembly may be increased by adding outer layers to the extent that the respective outside layers of adjacent nanotubes touch each other before exiting zone 6. This contact provides stability to the precise arrangement of the nanotubes 100 and increases the rigidity of the assembly. The increase of wall thickness T in zone 6, is an extension of the technology described for zone 2, with the modification that the steps of adding layers $w_i$ are adapted to the bent state of the nanotubes 100.

Where an increased wall thickness is provided in the bent section of zone 6, a different technology can be applied to create the subsequent quasi-conically expanded part, designated as zone 7 in FIG. 14. Zone 7 represents an alternative to zone 4 of FIG. 12. FIG. 14 illustrates zone 7, in which, for an expansion of the interior diameter d of each individual nanotube 100, the respective interior layers of the nanotube can be successively discontinued so that each time an inner layer ends, a previously intermediate layer becomes the inner layer.

Figure 15:
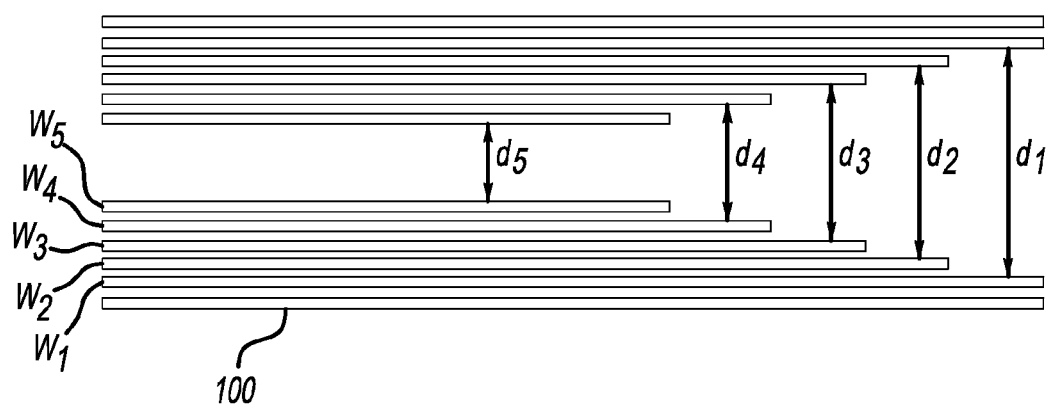
FIG. 15 schematically shows a change in an inner diameter of a multilayer nanotube by adding or removing interior graphene layers.

FIG. 15 illustrates such a successive removal of inner layers $w_i$. Each layer $w_i$ retains its constant diameter. The innermost layer $w_5$ of the multiwall nanotube 100 emerging from zone 6 has an inner diameter $d_5$ and ends in a first step at a defined distance from zone 5. Then the next layer $w_4$ with inner diameter $d_4$ ends at the next step in a defined distance from the first step, providing a quasi-conically expanding interior surface designated as zone 7. These steps are repeated with $w_3$ having diameter $d_3$, $w_2$ having diameter $d_2$, and so on, until the wall thickness T and inner diameter d of zone 5 are attained. The reduction in wall thickness T resulting from a single step corresponds to the distance between the layers $w_i$. Each of these steps is larger the previously described steps caused by the insertion of heptagons 96 and pentagons 94 into the honeycomb pattern 16, but the resulting quasi-conical surface can still be considered as smooth for total external reflection for most x-ray wavelengths.

The described nanotube-based collimating device can be reversed in a beam path to become a focusing optic for a parallel beam.

The above-described zones can be selectively combined in a polycapillary nanotube assembly. For example, for directing radiation from one focal point at the point-shaped beam source to the other focal point may include zones 1 and 2 and zone 6. The outer diameter of the nanotubes may then decrease subsequent to zone 6 in a reversal of zone 2 after the nanotubes have reached a parallel alignment relative to each other. The proper positions and directions of the nanotubes at the exit of the polycapillary optic can be ensured by precise control of the outer diameter of the nanotubes and tight assembly during manufacturing. The inner nanotube diameter could be reduced for a smaller focus with a reverse technology described for zone 4 or zone 7.

An alternative way of providing a focusing optic for a point-shaped beam source involves coupling of two collimating nanotube devices with the second device being reversed for focusing the beam that has been collimated by the first device. Different types of couplings can be implemented. A tight coupling with a precise alignment of the two assembles provides that the axes of the nanotubes of both assembles coincide. An alternative way of coupling can occur at a distance equal to or larger than the ratio between the exit internal nanotube diameter of the first device and the beam divergence. At such a distance, the beam distribution has become uniform so that an efficiency loss that may occur due to the clear aperture of the second device is fairly low because the nanotubes have a larger inner diameter at this cross section of the second assembly.

Nanotubes with a non-circular cross section could be preferable for forming a beam with a specific shape, for instance "fan" beam. It is known that nanotubes have a much lower strength in the radial direction compared to the axial direction. This feature could be used to change the nanotube shape from circular to oval, for instance by applying radial compression forces to the nanotubes assembly. Another way of achieving non-circular cross sections is using non-circular "seeds" for nanotubes growth on the growth plate. By aligning the nanotubes in a tight nanotube bundle along their length the nanotubes retain their shape obtained at the growth plate.

Even a nanotube comprising only a single nanotube positioned at the optical axis or in some bent position can incorporate some of the advanced features described above. As mentioned earlier, multiple versions of single glass capillary designs are used for multiple applications. The nanotube may be able provide a better performance in many situations due to its smooth interior wall and higher reflectivity. Accordingly, applications requiring the beam to have a limited cross section and divergence and that currently use a straight glass capillary can benefit from a straight nanotube. Both multiwall and colossal nanotubes could be used for this application.

A nanotube with an ellipsoidal internal surface for a single reflection focusing could be produced with the technology described for manufacturing conical nanotubes with adequate control of internal diameter steps at selected positions and in the desired direction. These nanotube devices may outperform the focusing capability of an ellipsoidal glass capillary due to the enhanced smoothness of their reflecting surfaces.

One preferred embodiment of the invention is a waveguide built by implementing nanotube technology. A straight nanotube could function as a waveguide and be effectively coupled via resonant beam coupling or via front coupling modes with a beam having a central symmetry and adequate convergence.

Also, two or more nanotubes can be assembled in the manner that a nanotube with a smaller $\theta_C$ is inserted inside a nanotube with a larger $\theta_C$. This arrangement allows utilizing an incoming beam with a larger angular convergence.

The exit end of the device may have a narrowing conical shape with a decreasing diameter for a further beam cross section reduction, both in single-layer and multilayer nanotubes.

Various radiation guiding devices based on nanotubes and multiple technological procedures for their implementation were described above. The described useful and implementable details of optical systems based on suitable self-assembling nanostructures serve to design, optimize, and build x-ray and neutron guiding devices. New self-assembling procedures and structures may lead to modifications of the described examples that are evident to a person of ordinary skill in the art.

Notably, the term "x-ray photons and neutrons" should not be interpreted in a narrow way. The invention is applicable to all types of charged or charge-less particles, which exhibit the total external reflection mechanism similar to the reflection of x-rays and neutrons.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A nanotube based device for guiding a beam of x-rays, photons, or neutrons, the device comprising:
   at least one self-assembling nanotube having a central axial line along a length between two ends, an optical entrance at one of the two ends and an optical exit at the other one of the two ends, the at least one nanotube being positioned that the optical entrance is oriented toward an incoming beam; the at least one nanotube being configured to redirect the beam though external total reflection on inner surfaces of the at least one nanotube and having a wall thickness that exceeds a defined radiation penetration depth at least in portions of the length, and
   at least one zone along the nanotube length, the zone being one of:
   a zone in which the central axial line of the at least one nanotube is positioned along a propagation direction of the incoming beam;
   a zone of a plurality of nanotubes having an increasing tube wall thickness adjacent at least one of the two ends so that outside walls of neighboring nanotubes touch each other in this zone;
   a zone in which the central axial line of the at least one nanotube is bent to provide desirable beam redirection, with a local bending radii, a local internal diameters, and a local outside diameters in different locations within the zone tight nanotubes packing in all assembly cross sections;
   a zone in which the central axial line is straight and the at least one nanotube has an expanding internal diameter;
   a zone of a plurality of nanotubes in which the central axial lines of the plurality of nanotubes are straight and the nanotubes have a uniform wall thickness and are packed tightly.

2. The device according to claim 1 wherein the at least one nanotube is a multiwall nanotube.

3. The device according to claim 1 wherein the at least one nanotube is a colossal nanotube.

4. The device according to claim 1 wherein the at least one nanotube is a carbon nanotube.

5. The device according to claim 1, wherein the at least one nanotube is a plurality of nanotubes, wherein the optical entrances are oriented toward a first point, and the optical exits are oriented toward a second point.

6. The device according to claim 1, wherein the at least one nanotube is a plurality of nanotubes, wherein the optical entrances are oriented toward a first point, and the optical exits are oriented parallel to each other.

7. The device according to claim 1, wherein the device comprises a single nanotube.

8. The device according to claim 7, wherein the nanotube has a cylindrical internal shape.

9. The device according to claim 8, wherein the device comprises nanotubes from different materials coaxially inserted in one other, the nanotubes of different materials forming coaxial layers.

10. The device according to claim 9, wherein the coaxial layers of a smaller diameter are made of a material having a smaller critical external total reflection angle than the coaxial layers of a larger diameter.

11. The device according to claim 7, wherein the at least one nanotube is a multilayer nanotube with an internal layer having a conical shape with decreasing diameter at the optical exit.

12. The device according to claim 7, wherein the nanotube is a colossal nanotube.

13. The device according to claim 12, wherein internal multiwall nanotube has a smaller refraction coefficient.

14. The device according to claim 7 when the nanotube has a conical internal shape.

15. The device according to claim 14, wherein the conical internal shape is located adjacent the optical exit.

16. The device according to claim 7, wherein the nanotube has an ellipsoidal, paraboloidal, or hyperboloidal internal shape.

17. The device according to claim 7, wherein the single nanotube comprises an internal multiwall nanotube coaxially aligned with an external multiwall nanotube, the internal multiwall nanotube and the external multiwall nanotube having different refraction coefficients.

* * * * *